(12) United States Patent
Groen et al.

(10) Patent No.: US 10,013,002 B2
(45) Date of Patent: Jul. 3, 2018

(54) FLUID FLOW REGULATOR DEVICE, COMPRISING A VALVE MEMBER AND A VALVE SEAT DEFINING A FLUID FLOW SURFACE AREA, AS WELL AS METHOD OF USING THE SAME

(71) Applicant: BERKIN B.V., Ruurlo (NL)

(72) Inventors: Maarten Sytze Groen, Ruurlo (NL); Robert Anton Brookhuis, Ruurlo (NL); Dannis Michel Brouwer, Ruurlo (NL); Remco John Wiegerink, Ruurlo (NL); Joost Conrad Lötters, Ruurlo (NL)

(73) Assignee: Berkin B.V., Ruurlo (NL)

( * ) Notice: Subject to any disclaimer, the term of this patent is extended or adjusted under 35 U.S.C. 154(b) by 249 days.

(21) Appl. No.: 15/031,206

(22) PCT Filed: Oct. 24, 2014

(86) PCT No.: PCT/NL2014/050736
§ 371 (c)(1),
(2) Date: Apr. 21, 2016

(87) PCT Pub. No.: WO2015/060721
PCT Pub. Date: Apr. 30, 2015

(65) Prior Publication Data
US 2016/0282882 A1    Sep. 29, 2016

(30) Foreign Application Priority Data

Oct. 24, 2013 (NL) ...................... 2011669

(51) Int. Cl.
F16K 31/02 (2006.01)
G05D 7/06 (2006.01)
F16K 99/00 (2006.01)

(52) U.S. Cl.
CPC ....... G05D 7/0694 (2013.01); F16K 99/0009 (2013.01); F16K 99/0048 (2013.01)

(58) Field of Classification Search
CPC . G05D 7/0694; F16K 99/0048; F16K 99/009; Y10T 137/7761; Y10T 137/8158;
(Continued)

(56) References Cited

U.S. PATENT DOCUMENTS 5,092,360 A * 3/1992 Watanabe ............. F16K 31/007
                                                                   137/487.5
5,142,781 A * 9/1992 Mettner ................... F15C 5/00
                                                                   29/890.124

(Continued)

*Primary Examiner* — Minh Le
(74) *Attorney, Agent, or Firm* — Casimir Jones S.C.; Tyler J. Sisk

(57) ABSTRACT

The invention relates to a fluid flow regulator device, comprising a valve member and a valve seat arranged to be movable with respect to each other such that a fluid flow surface area defined by the valve member and the valve seat can be changed. Furthermore, sensor means are provided for measuring a capacitance related to at least a measure of the fluid flow surface area. According to the invention, the sensor means are arranged such that the capacitance measured is inversely proportional to the distance between the valve member and the valve seat. In an embodiment, a reference capacitance relating to fluid flow conditions is measured.

15 Claims, 5 Drawing Sheets

Figure 1:
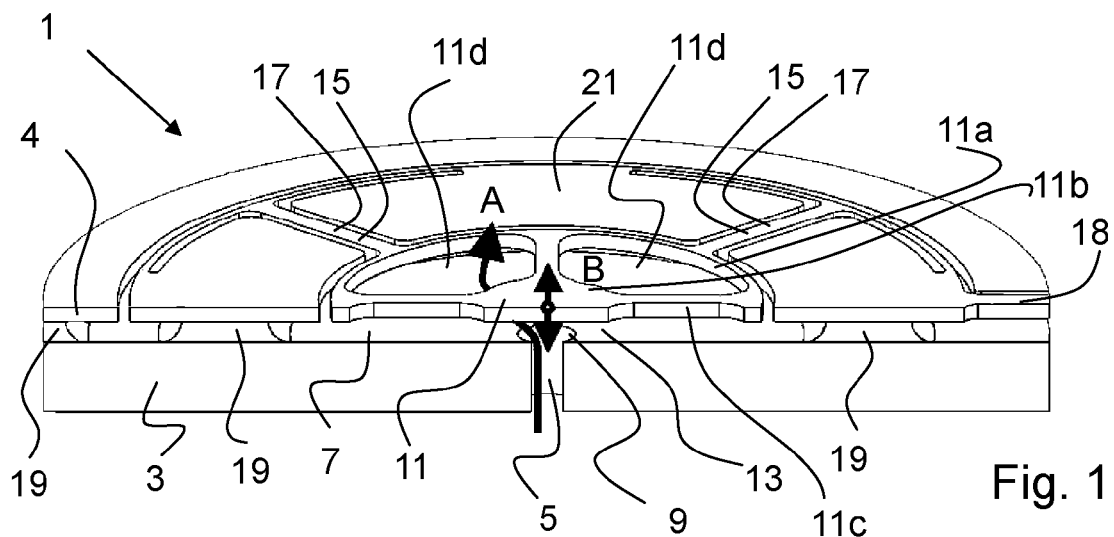

(58) Field of Classification Search
CPC ......... Y10T 137/8225; Y10T 137/8242; Y10T 137/2642; Y10T 137/2698; Y10T 137/5994
USPC ..... 137/487.5, 551, 553, 554, 115.26, 119.1, 137/315.05
See application file for complete search history.

(56) References Cited

U.S. PATENT DOCUMENTS

| | | | | |
|---|---|---|---|---|
| 5,216,273 | A * | 6/1993 | Doering | F15C 5/00 251/129.01 |
| 6,182,941 | B1 * | 2/2001 | Scheurenbrand | F15C 5/00 137/554 |
| 6,710,507 | B2 * | 3/2004 | Murphy | H02N 1/006 310/309 |
| 6,761,063 | B2 * | 7/2004 | Mengle | G01D 5/24 73/168 |
| 7,025,324 | B1 * | 4/2006 | Slocum | B01L 3/502738 251/11 |
| 7,192,001 | B2 * | 3/2007 | Wise | F15C 5/00 251/11 |
| 7,217,395 | B2 * | 5/2007 | Sander | B01L 3/0268 347/48 |
| 9,046,192 | B2 * | 6/2015 | Mescher | G05D 7/0113 |
| 2003/0001590 | A1 | 1/2003 | Mengle | |
| 2005/0001182 | A1 | 1/2005 | Wise et al. | |
| 2005/0238506 | A1 * | 10/2005 | Mescher | A61M 5/14276 417/413.1 |
| 2009/0162707 | A1 * | 6/2009 | Nakakubo | F16K 99/0001 429/515 |
| 2014/0366641 | A1 * | 12/2014 | Jedema | G01F 25/0007 73/861.12 |

* cited by examiner

FLUID FLOW REGULATOR DEVICE, COMPRISING A VALVE MEMBER AND A VALVE SEAT DEFINING A FLUID FLOW SURFACE AREA, AS WELL AS METHOD OF USING THE SAME

The invention relates to a fluid flow regulator device, comprising a valve member and a valve seat arranged to be movable with respect to each other such that a fluid flow surface area defined by the valve member and the valve seat can be changed, as well as sensor means for measuring a capacitance related to a measure of the fluid flow surface area.

Such a device is known from U.S. Pat. No. 6,182,941 B1. The known device comprises a housing defining a valve chamber, wherein a movable valve member is provided. At a bottom side of the housing a valve seat is provided, and a fluid flow surface area defined by the valve seat and the valve member may be changed, by moving the valve member with respect to the valve seat. At an upper side of the housing and on the side of the valve member facing the upper side of the housing, capacitor plates are provided. With this, it is possible to measure the capacitance between the housing and the valve member, which is a measure for the distance between the valve member and the valve seat, and hence a measure for the fluid flow surface area.

It is an object of the invention, to provide a fluid flow regulator device which enables the fluid flow to be regulated more accurately.

Accordingly, the invention provides a fluid flow regulator device of the aforementioned kind, which comprises:

A valve member and a valve seat arranged to be movable with respect to each other such that a fluid flow surface area defined by the valve member and the valve seat can be changed;

An actuator element arranged for moving the valve member relative to the valve seat;

Sensor means for measuring a capacitance related to at least a measure of the fluid flow surface area;

Reference sensor means that are arranged for measuring a reference capacitance value for a fluid flow condition; and Control means that are connected to the sensor means and the reference sensor means, wherein the control means are arranged for controlling the actuator element based on signals obtained by the sensor means and the reference sensor means.

In the fluid flow regulator of the invention, the actuator element may be connected to the valve member. The actuator element may for instance be a Piezo element, which enables a precise actuator in a compact device. The actuator may be used to control the position of the valve member, to increase or decrease the fluid flow area, and to enable more or less flow per time unit to flow through the fluid flow surface area. It is also possible to hold the valve at a desired position, such that a pre-determined fluid flow surface area may be set.

In the fluid flow regulator of the invention, reference sensor means are arranged for measuring a reference capacitance value for a fluid flow condition. With this it is foreseen that the capacitance measured by the sensor means is influenced by the actual fluid flowing through the device. For example, varying moisture contents of the fluid may increase or decrease the capacitance measured by the sensor means. To counteract for this influence, and to thus improve the accuracy of flow regulation, the fluid flow regulator device according to the invention comprises said reference sensor means. The reference capacitance may be measured using for instance two reference capacitor plate elements that are positioned at a distance from each other, wherein in between the two capacitor plates a reference flow path for the fluid flow is provided. The reference sensor means may be provided upstream or downstream of the valve member and/or the valve seat. As the fluid flows through the reference flow path in between the two capacitor plates, a reference value for the capacitance for the fluid flow may be measured. With the reference value known, it is in an embodiment possible to correct the capacitance measurement obtained by the sensor means, given the specific fluid flow conditions. To this end, the device may comprise a control unit arranged for using the reference capacitance value for correcting the capacitance measured by the sensor means.

In the fluid flow regulator of the invention, control means are provided that are connected to the sensor means and to the reference sensor means, wherein the control means are arranged for controlling the actuator based on signals obtained by the sensor means and the reference sensor means. The reference capacitance value mentioned above may be used to directly or indirectly correct the capacitance measurement obtained by the sensor means, as already indicated above. The control means may be used to activate the actuator, to set the valve member at a position corresponding to a desired fluid flow surface area, and/or to keep the valve member at a constant position relating to a constant fluid flow surface area. The control means may in an embodiment use the capacitance measured in order to activate or deactivate the actuator. A feed forward or feedback control strategy may be used.

In an embodiment of the fluid flow regulator, the sensor means are arranged such that the capacitance measured is substantially inversely proportional to the distance between the valve member and the valve seat. The capacitance is an inverse measure for the valve separation, i.e. for the distance between the valve member and the valve seat. The distance between the valve member and the valve seat is related to the fluid flow surface area, and the latter may be determined. This determination depends on the design of the movable valve, e.g. whether the movable valve translates to/away from the valve seat, makes an angular (pivotal) movement, or slides in front of/away from the valve seat, but in each case it will be possible to determine or calculate at least a measure of the fluid flow surface area, especially so when the exact position of the valve member is known, using the specific dimensions and geometry of the fluid flow device. Particularly advantageous of the arrangement of the sensor means described above, is that the capacitance measured is relatively high when the valve member is relatively close to the valve seat, and that the sensitivity of the measurements in this state (i.e., when the valve member is relatively close to the valve seat) is relatively high. With this, the sensitivity of the fluid flow device is increased for relatively low fluid flow surface areas.

In an embodiment, the sensor means comprise at least two capacitor plate elements. One, or both of these capacitor plate elements may be formed by one or both of the valve member and the valve seat. One plate element is associated with the position of the valve member, and one plate element is associated with the position of the valve seat. The at least two plate elements define a fluid flow path, through which fluid flowing through the fluid surface area may flow.

In an embodiment, the sensor means are arranged for directly measuring the capacitance between the valve member and the valve seat. It is thinkable that the valve member consists of the capacitor plate. To ensure that even in a closed position of the valve member, a capacitance may be measured, it is conceivable that one of the capacitor plate elements, for instance the valve member, or the valve seat, or even both, are electrically insulated, for instance by providing a insulator layer thereon.

A further improvement in the accuracy of the measurements is obtained when the sensor means comprise a plurality of capacitive sensor elements. With this it is possible to more accurately determine the actual position of the valve with respect to the valve seat. For instance, a plurality of sensor elements may be used to assess the relative position between the valve member and the valve seat using a plurality of different points, thereby rendering it possible to determine the fluid flow surface area defined by the valve plate and the valve seat more accurately. For instance, when the valve member is construed as a translating plate design, it is conceivable that the movable valve member also exhibits a rotation-like movement, along with a translational movement. Thus, using a plurality of sensor elements, it is possible to measure the actual position of the valve member more accurately, and hence the actual fluid flow surface area may be determined more accurately.

In an embodiment, the plurality of sensor elements each comprise a valve capacitor plate element associated with the valve member or with its position, as well as a corresponding valve seat capacitor plate elements associated with the valve seat or with its position.

In an embodiment, the plurality of valve capacitor plate elements are arranged concentrically. For instance, the plurality of plate elements may have varying dimensions, such that a concentric arrangement of smaller plate elements surrounded by bigger plate elements is possible. The plate elements may have a circular shape, although any other suitable shape, such as rectangular, or triangular, is conceivable for constructing a concentric arrangement. Alternatively, the concentric arrangement may relate to a circular arrangement of the plurality of plate elements. In the latter case, the plate elements may be constructed such that each forms a part of a circle. For the valve seat plate elements, a construction corresponding to the arrangement of the valve capacitor plate elements is preferably used.

In an embodiment, the sensor means are integrated into at least one of the valve member and the valve seat, rendering a relatively compact fluid flow device.

The valve member may in an embodiment be movable towards and away from the valve seat. However, it is also possible that the valve member is pivotable with respect to the valve seat, or is slidably connected near the valve seat.

In an embodiment, the fluid flow device comprises a base part having the valve seat, as well as a top part having the valve member. In an embodiment, means are provided for electrically insulating the top part with respect to the base part. This allows for a compact construction, ensures that capacitive measurements may be performed, and additionally simplifies the manufacturing process as will be explained further on.

It is to be noted that although it is referred to "top part", this does not necessarily mean that this part always is the most upper part of the fluid flow device. For example, further parts may be present on top of the top part. Furthermore, the term is not limited to a specific orientation of the device wherein the top part actually is facing upwards. Orientations wherein the top part is facing sideways or even downwards are conceivable as well. The term top part is therefore not to be interpreted narrowly.

The top part extends in an embodiment at a distance from, and mainly parallel to the base surface of the base part.

The surface of the top part (i.e. top surface) facing the base surface may be substantially flat. The top part may have a plate-like shape, in particular a substantial circular plate shape, although other forms are conceivable as well. The base part may have a plate-like shape, such as a substantial circular plate shape. Other forms are conceivable, however. In particular, the base part (or base surface) may have the same shape as the top part (or top surface). The base surface of the base part may be substantially flat. The top may extend at a distance from, and mainly parallel to the base surface of the base part. In this way, the top part is positioned at a substantially constant distance from the base part.

The top part may comprise at least one bond pad element. This bond pad element may be arranged for allowing capacitive measurements across the valve. The bond pad element may be provided at a distance from the valve member, preferably at a position radially outwards from the flow channel. A connection to actual measurement elements may thus be obtained at a distance from the moveable valve member, which increases the reliability.

A compact design is furthermore ensured, when the device comprises a substantially circular shape. This substantially circular shape may be viewed in a direction substantially parallel to a longitudinal axis of the flow channel. The device may be cylindrically shaped. The device itself may have a cylindrical shape, by forming at least the base part (and in an embodiment also the top part) cylindrically.

The electrically insulated connection may be established for example by means of an insulator element positioned at a distance from the outer end of the flow channel. The insulator element then separates the top part and the base part.

The valve member may be integrally connected to the top part. This also provides a durable, reliable and particularly compact construction.

The valve member is in an embodiment movably connected to the top part by means of suspension means. In an embodiment, the suspension means comprise flexure beam elements. These beam elements are relatively compact.

The suspension means may be electrically conducting. In a specific embodiment, electrically conducting flexure beam elements are used. The beam elements ensure that the valve member may move, and at the same time provide an opportunity for measuring the capacitance between the valve member and the valve seat.

The suspension means, e.g. the beam elements, extend in an embodiment substantially parallel to a plane formed by the valve member. It is conceivable that the beam elements extend substantially in the plane formed by the valve member. A compact construction, with room for movement of the valve member, in an embodiment in the direction perpendicular to the plane formed by the valve member, is thus obtained.

It is to be noted that the flow path through the device may in principle be designed in any form. For instance, fluid may flow from the bottom, past the valve member, towards the top. Fluid may thus enter the device at the bottom (e.g. base part) of the device, and exit the device at an upper part thereof (e.g. top part, in an embodiment). As stated, the orientation of the device may be arbitrarily chosen, such that in fact fluid enters an upper part of the device, and exits below. Alternatively, it is conceivable that fluid enters the device at a certain part (e.g. bottom part), and exits the device at the same part (e.g. bottom part). Thus, a sort of loop is designed in the flow path. A sideways (horizontally) extending flow-path, with or without bend or loop in the flow-path is also conceivable. As stated, there is no limitation in any kind of flow path that may be obtained or designed with the device according to the invention.

It is further to be noted that the direction of flow is not limited. Fluid may flow from the flow channel in the base part towards the valve seat, and past the valve member. An exit flow channel may be provided downstream of the valve member, such that the fluid can exit the device. Alternatively, it is conceivable that fluid flows along the valve member (e.g. via an inlet flow channel), past the valve seat and towards and through the flow channel in the base part.

According to an aspect, the invention relates to a method of regulating a fluid flow using a fluid flow regulator device according to the invention. The method comprises the steps of using the sensor means for measuring the capacitance related to at least a measure of the fluid flow surface area;

using the reference sensor means for measuring a reference capacitance value for a fluid flow condition;

using the signals obtained by the sensor means and the reference sensor means for moving the valve member relative to the seat.

With this, the reference capacitance may be used for correcting the capacitance value measured, since it might be influenced by the actual fluid flowing through the device. For example, varying moisture contents of the fluid may increase or decrease the capacitance measured by the sensor means, such that only measuring the capacitance using the sensor means cannot give an accurate account of the actual fluid flow surface area. By using the reference capacitance, the capacitance measured by the sensor means may be corrected, to obtain a more accurate determination of the fluid flow surface area. The method according to the invention thus allows for more precise and accurate fluid flow regulation.

According to an aspect, the invention relates to a method of calibrating a fluid flow device according to the invention. The method is characterized in that it comprises the step of determining the fluid flow surface area based on signals obtained by the sensor means and the reference sensor means. With this, it is possible to accurately calibrate the valve. The fluid flow surface area may advantageously be measured using sensor means of the device according to the invention. Advantages of the method have already been explained with respect to the device according to the invention.

The method comprises the step of measuring at least a measure of the capacitance between the valve member and the valve seat, which is a measure of the distance between the valve member and the valve seat.

When the capacitance is used as a measure for the fluid flow surface, the following is observed. In almost any design, a parasitic capacitance will occur between parts of the device surrounding the valve member (for instance at a radial distance thereof), and parts of the device surrounding the valve seat (for instance at a radial distance thereof. To account for this parasitic capacitance, the method according to the invention may comprise the step of correcting, for instance normalizing, the measured capacitance. It has turned out that a near-linear relation exists between displacement of the valve member and the inverse corrected, for instance normalized capacitance.

The method may therefore comprise the step of calculating a corrected capacitance. The corrected capacitance may be calculated using:

$$C_n = C_m - C_2$$

wherein $C_m$ is the measured capacitance ($C_m = C_1 + C_2$), $C_1$ is the capacitance between the valve plate and the valve seat, $C_2$ is the substantially constant parasitic capacitance occurring in the fluid flow device.

In a further correction, the initial measured capacitance ($C_0 = C_1 + C_2$) at a predetermined valve separation may be used:

$$C_n = \frac{C_m - C_2}{C_0 - C_2}$$

In an embodiment, the initial capacitance $C_0$ may be measured when the distance between the valve member and the valve seat is maximal, to obtain a normalized capacitance.

Furthermore, correcting for fluid flow induced changes in capacitance (based on conditions of the fluid flow, i.e. moisture content of the fluid flow) is incorporated, by using the reference sensor means described earlier.

The device according to the invention may be manufactured relatively easily, with a method of manufacturing a fluid flow device comprising the steps of:

providing a base part having a base surface;

providing an electrically insulating layer on the base surface;

providing a top part on the insulating layer;

providing a flow channel in the base part, such that an outer end of the flow channel ends at the base surface;

providing a valve member in the top part, such that the valve member is positioned substantially in line with the outer end of the flow channel;

removing a part of the insulating layer between the valve member and the outer end of the flow channel, for forming a flow path along the valve member. According to the invention, the method comprises the step of providing sensor means for measuring a capacitance that is inversely proportional to the distance between the valve member and the valve seat.

The sensor means may comprise capacitor plates. These may be constituted by the valve member and the base part (valve seat), or in an embodiment, may be provided thereon. The capacitor plate element on the base part may be provided on the valve seat. At least one of the capacitor plate elements may be electrically insulated, such that the capacitance may be measured, even when the valve member is in a closed position, abutting the valve seat.

The manufacturing process may use silicon-on-insulator technology. The base part and the top part may be a silicon layer, the insulating layer may be a buried silicon oxide layer.

The method may conveniently comprise the step of removing material from the base part, and/or from the top part, preferably using an etching process, such as deep reactive ion etching. By removing material from the base part, the flow channel may be formed. By removing material from the top part, the valve member (having a plate like shape, for instance, and having flexible beam elements connected thereto, for example) may be formed. In this way, a top part comprising a top layer integrally connected to the valve member may be formed.

The step of removing a part of the insulating layer may comprise a sacrificial etch step. It is noted that part of the insulating layer, positioned at a distance from the flow channel, is kept intact, so as to allow the top part to be positioned at a given distance from the base part.

By using a silicon-on-insulator technology, for instance, it is possible to manufacture a fluid flow device wherein the thickness of the insulating layer, as measured between the base part and the top part, is in between 1 to 10 micrometer, preferably between 3 to 5 micrometer. In total, a device having a diameter of approximately 7.5 mm and a thickness of 0.5 mm may be obtained. It is expected that smaller dimensions, for instance a thickness smaller than 1 micrometer, is obtainable as well.

Figure 2A:
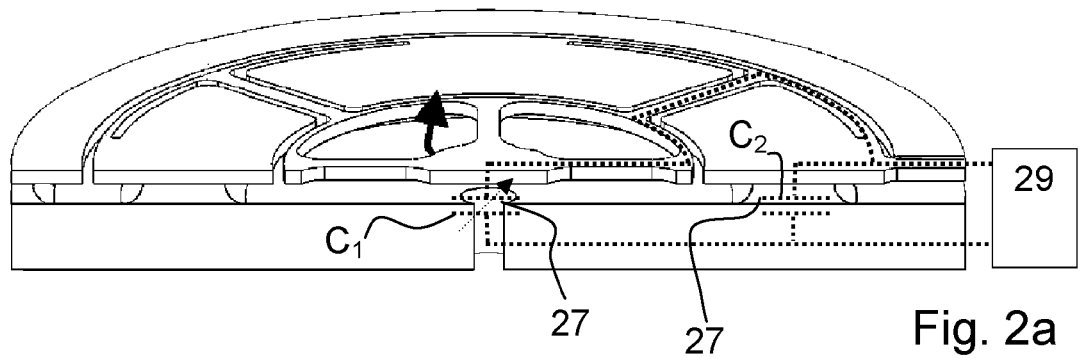
Figure 2B:
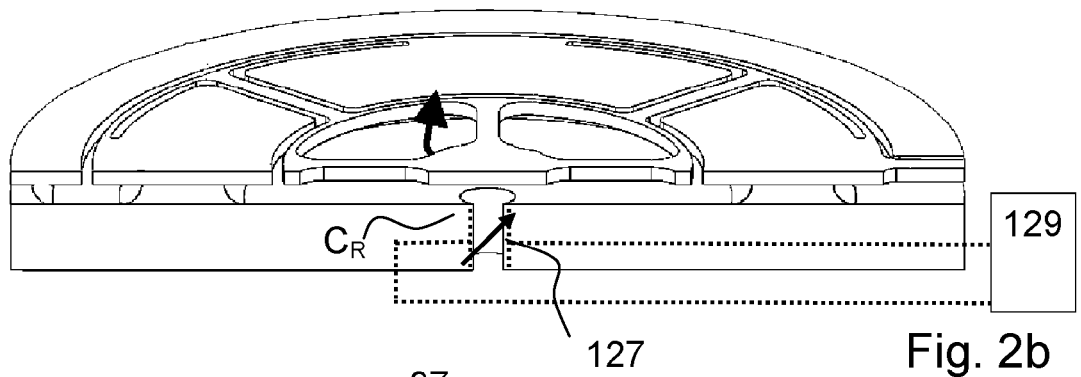
Figure 3:
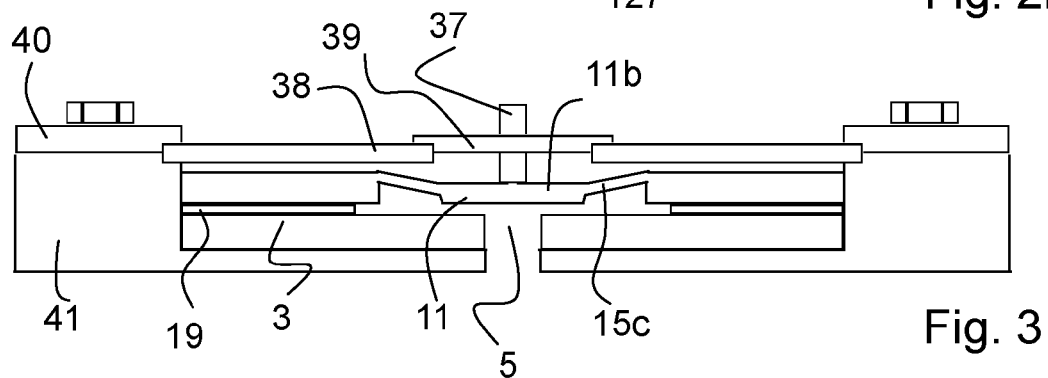
Figure 5A:
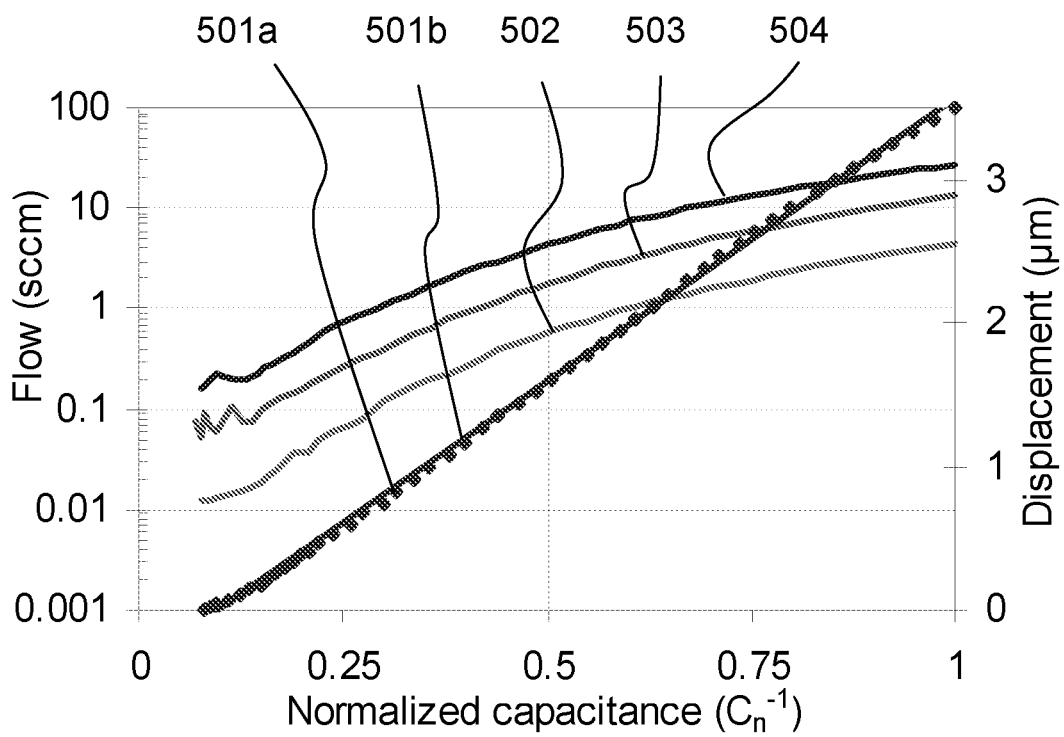
Figure 5B:
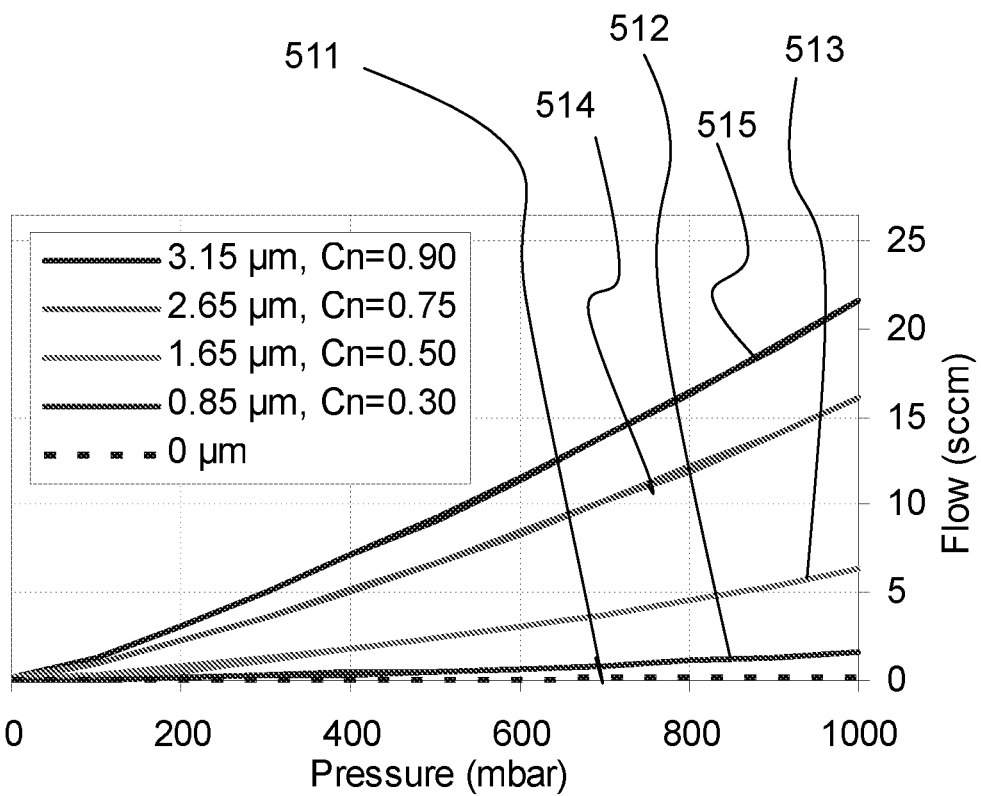
Figure 6A:
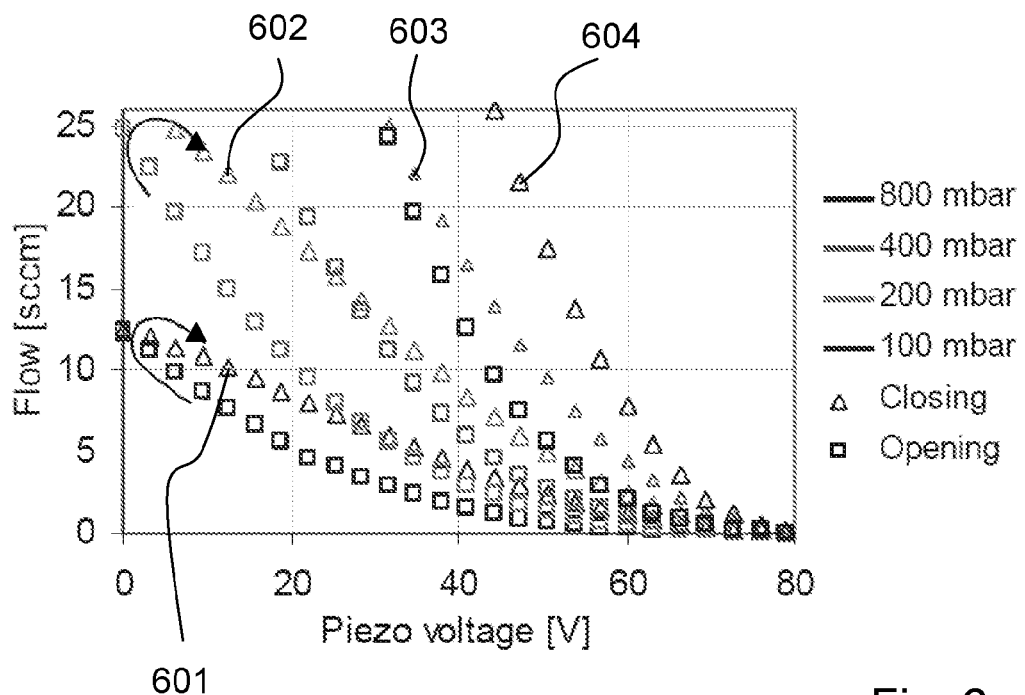
Figure 6B:
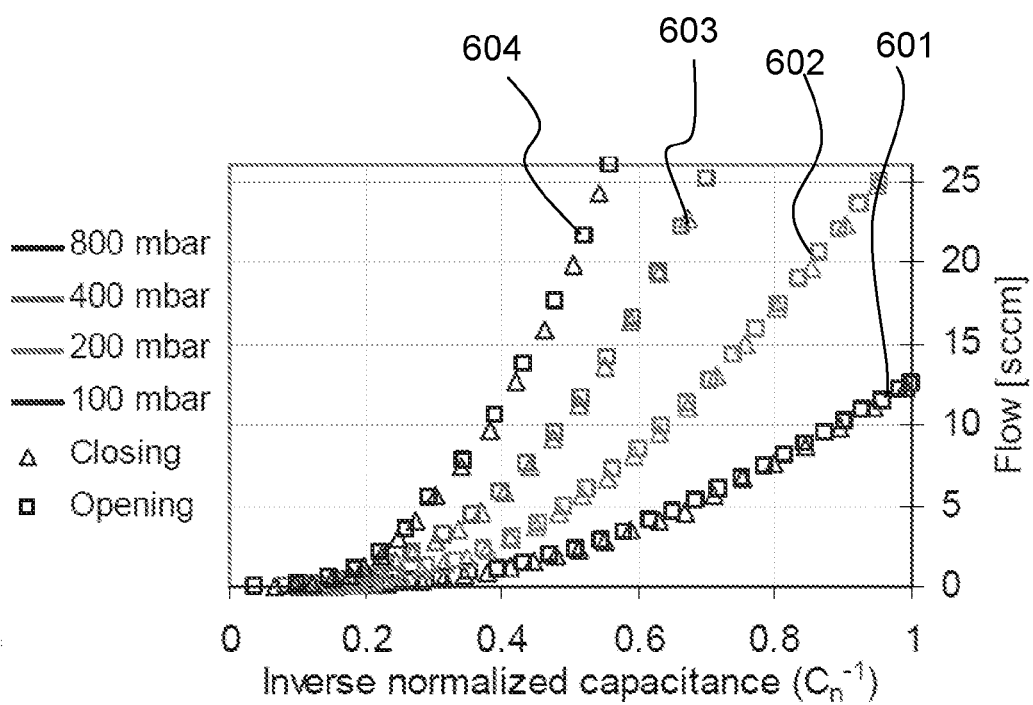
Figure 7A:
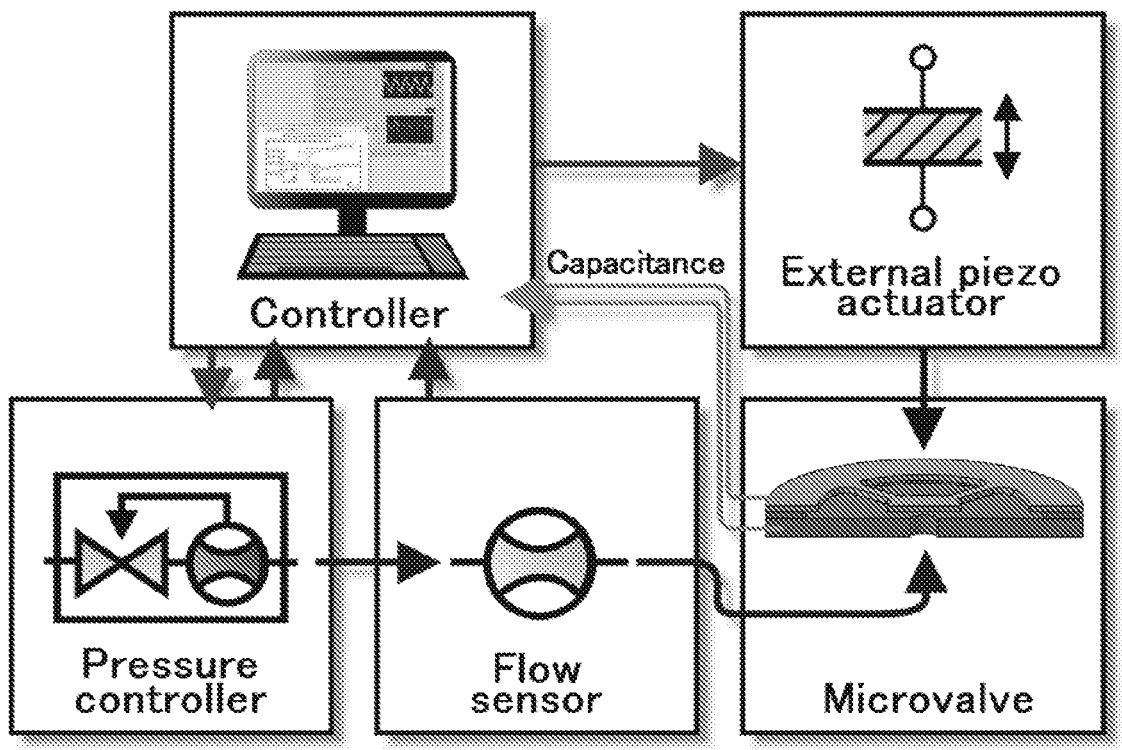

The invention will next be explained by means of the accompanying figures, which show embodiments of the current invention. The embodiments are not intended to be limiting in nature. The figures show:

FIG. 1—shows a perspective view of a fluid flow device according to the invention;

FIG. 2a—shows a schematic view of the fluid flow device comprising sensor means;

FIG. 2b—shows a schematic view of the fluid flow device comprising reference sensor means;

FIG. 3—shows a schematic sectional view of the fluid flow device according to the invention;

FIG. 4a-e—show schematic sectional views of the method for manufacturing a fluid flow device according to the invention;

FIG. 5a—valve plate displacement and the gas flow as a function of the inverse of normalized capacitance $C_n$;

FIG. 5b—Gas flow as a function of inlet pressure, measured at decreasing displacements;

FIG. 6a—Gas flow as a function of piezo voltage, showing hysteresis effects during opening and closing of the valve member;

FIG. 6b—Gas flow as a function of inverse capacitance, during opening and closing of the valve member;

FIG. 7—Schematic view of the setup used to characterize the microvalve flow behaviour.

FIG. 1 shows a cross-sectional view in perspective of a fluid flow device 1 according to an embodiment of the present invention. The fluid flow device 1 in FIG. 1 has a substantially cylindrical shape. For clarification purposes, the device is shown in cross-section, wherein the plane of cross-section extends mainly parallel to the centerline of the cylindrical shape. Here, approximately one half of the flow device 1 has been removed for clarification.

The flow device 1 comprises a base part 3, provided at the bottom of the fluid flow device 1. The base part 3 is in the embodiment shown formed as a single circular plate. In the axial centerline of the circular plate of the base part 3, a substantially cylindrical flow channel 5 is provided. The flow channel 5 ends at a base surface 7 of the base part 3. The end 9 of the flow channel 5 defines a valve seat 13 at said base surface 7.

On top of the base part 3, an insulating layer 19 is provided. In the embodiment shown, the insulating layer 19 is substantially annular in form, and is provided at a radial distance from the flow channel 5. Provided on the insulating layer 19 is a top part 4, which in the embodiment shown comprises a circular plate like shape. The distance between the top part 4 and the base part 3 may be several micrometers, such as for instance 1 to 10 micrometer, preferably 3 to 5 micrometer, although the design may function at greater distances, for example in the order of several millimeters, as well.

In the top part 4, several cutouts are provided, so as to form a centrally positioned valve member 11. The valve member 11 is positioned in line with the longitudinal axis of the flow channel 5. The valve member 11 is formed as a generally circular plate having an annular outer valve part 11a, and a central valve part 11b positioned above the outer end of the flow channel 5. Webs 11c connect the central valve part 11b to the annular outer valve part 11a. In this way, several through flow openings 11d are formed in the valve member 11. The valve member 11 is connected to an outer part of the top part 4 by means of suspension means 15 in the form of flexible beams 17. Due to the construction shown, the annular outer valve part 11a and the webs 11c form actual part of the suspension means 15. These suspension means 15 in the form of elongated flexible beams 17, 11a, 11c ensure that the valve member 11 may move towards and/or away from the outer end of the flow channel 5, indicated by arrow B. It is noted that the suspension means 15 are arranged such that the valve member 11 in the form of the central valve part 11b may completely close off the outer end of the flow channel 5. In that sense, the part of the base surface surrounding the outer end 9 of the flow channel 5 forms a valve seat 13.

Fluid flow may enter the device 1 from the lower part of the flow channel 5, move upwards to the outer end 9 of the flow channel 5, move along the central valve part 11b, as shown by arrow A, and through the flow openings 11d (two of which are shown in FIG. 1). In an embodiment (not shown), the valve openings 11d are closed, to obtain an alternative flow path, wherein, for example, both an inlet and outlet are provided in the base part.

Referring back to FIG. 1, when the valve member 11 is positioned closer to the valve seat 13, then the surface area for fluid flow is smaller, and a reduced fluid flow rate is to be expected. When the valve member 11 is positioned further away from the valve seat 13, then an increased fluid flow surface area is provided, and the fluid flow rate through the device may be increased.

Sensor means 27 (see FIG. 2a) are provided for measuring a capacitance related to at least a measure of the fluid flow surface area. According to an advantageous embodiment of the invention, the sensor means 27 are arranged such that the capacitance measured is inversely proportional to the distance between the valve member 11 and the valve seat 13. In other words, the measured capacitance is relatively high when the valve member 11 is relatively close to the valve seat 13, and the measured capacitance is relatively low when the valve member 11 is further away from the valve seat 13. In general, the sensor means may comprise a capacitor plate (not shown) provided on the valve member 13 as well as a second capacitor plate (not shown) provided on the base surface 7 of the base part 3. In the embodiment shown, the valve member constitutes one capacitor plate, and the base part, in particular the valve seat thereof, constitutes the second capacitor plate. Details of an embodiment of the sensor means 27 are shown in FIG. 2a.

FIG. 2a shows the fluid flow device 1 of FIG. 1, wherein a schematic representation of the sensor means 27 according to an embodiment of the invention are shown. It is referred to both FIG. 1 and FIG. 2a. The dashed lines in FIG. 2a indicate the electrical diagram. Due to the design of the fluid flow device, a variable capacitance $C_1$ is present between the central valve part 11b and the valve seat 13 (see FIG. 1). When the valve member 11 is closer to the valve seat, the capacitance increases, and it decreases when the valve member 11 is further away from the valve seat 13. Likewise, a parasitic capacitance $C_2$ is present between the top part 4 and the base part 3, at the position of the insulating layer 19. This parasitic capacitance $C_2$ is substantially constant. As can be seen in FIG. 2a, the capacitors $C_1$ and $C_2$ are connected in parallel, and are furthermore connected to control means generally indicated by 29.

As stated before, capacitance $C_1$ is predominantly a function of the distance between the valve member 11 and valve seat 13. Capacitance $C_2$, however, is substantially independent of the distance. In practice, the capacitance $C_2$ is substantially a fixed value, which is determined by the implementation of the flow device 1. The total capacitance measured is the sum of the variable capacitance $C_1$ and the substantially constant capacitance $C_2$. Thus, it is possible to correct the measured capacitance $C_m$ by using the equation:

$$C_n = C_m - C_2$$

wherein $C_m$ is the measured capacitance ($C_m = C_1 + C_2$), $C_1$ is the capacitance between the valve plate and the valve seat, $C_2$ is the substantially constant parasitic capacitance occurring in the fluid flow device.

A further correction is possible by introducing the initial capacitance at a predetermined valve separation, preferably the maximum valve separation:

$$C_n = \frac{C_m - C_2}{C_0 - C_2}$$

wherein $C_0$ is the initial measured capacitance ($C_0 = C_1 + C_2$) at a predetermined valve-seat separation, for instance the maximum valve-seat separation (by using this maximum valve-seat separation, the capacitance is normalized). The inverse of the corrected (or normalized) capacitance $1/C_n$ is proportional to the valve displacement, as will be explained later.

Thus, in an embodiment a translating plate design is chosen as it allows very large design freedom to simplify fabrication. The valve plate 11 is suspended by suspension means in the form of flexure beams 15, 17, which in the embodiment shown are electrically conducting flexure beams 15, 17, separated from the valve seat 13 by the thickness of an insulating layer in the form of a buried oxide layer 19. Conducting beams 15, 17 are contacted through a bond pad 18 on the outer edge of the chip, allowing measurements, in particular capacitive measurements (using sensor means 27) across the fluid flow device 1, which can be a so called microvalve 1. As explained above, the electrical model of the valve consists of a variable capacitance $C_1$ between plate 11 and seat 13, connected in parallel to constant parasitic capacitances $C_2$ between the top 4 and bottom parts 3 (see FIG. 2a).

FIG. 2b shows the fluid flow device 1 of FIG. 1, wherein a schematic representation of reference sensor means 127 according to the invention is shown. It is referred to both FIG. 1 and FIG. 2b. The dashed lines in FIG. 2b indicate the electrical diagram. Due to the design of the fluid flow device, the fluid flowing past the valve and valve seat may introduce an effect on the capacitance measured by the capacitance sensor means 27. To correct for this influence, the reference sensor means as shown in FIG. 2b are provided, which are able to measure the (variable) capacitance induced by the fluid flowing past capacitor plates 127 of the reference sensor means. Since the capacitor plates 127 of the reference sensor means are at a fixed distance, it will be possible to correct the capacitance measured by the sensor means 27 for changing capacitance in the fluid flow measured by the reference sensor means 127. The reference sensor means 127 are connected to a control unit 129. This control unit 129 may in an embodiment be the control means 29, as indicated in FIG. 2a. In an embodiment, the control unit 129 is connected to the control means 29, such that measurements obtained by the reference sensor means 127 may be used to correct the capacitance measured by the sensor means 27. It is furthermore noted that the electrical diagram of FIG. 2b is schematically only.

FIG. 3 shows a schematic cross-section of an embodiment of the flow device 1. The flow device 1 is provided in a container 40, 41 having a lower container portion 41 and comprising an upper holder portion 40. The lower holder portion 41 includes a circular plate with a raised outer edge. The base portion 3 of the flow device 1 is resting on the bottom of the lower holder part 41. The flow device 1 is surrounded by the outer edge of the lower holder portion 41. On the upper side of the outer edge of the lower holder part 41, the upper holder part 40 is arranged. The holder parts 40, 41 constrain an actuator comprising in an embodiment a piezoelectric disk 38, which is annular in form and which is positioned above, and concentric with respect to the valve member 11. The piezoelectric disc 38 comprises a central opening which is located above the valve member 11. In the opening of the piezo disk actuator 38 a connecting means 39 is present, which connects the piezoelectric disc 38 to the valve member 11. The piezoelectric disc 38 and the actuator connection means 39 together form the actuator element 37. The actuator element 37 is connected to the upper side of the central valve portion 11b of the valve member 11. The valve member 11 is thus movable in the directions of arrow B in FIG. 1 under the influence of the fluid flow on the one hand and the actuator element 37 on the other hand.

The actuator element 37 is capable of moving the valve member 11 from or to the valve seat 13. Owing to this movement the flow resistance of the fluid flowing through the valve member 11 is influenced. The distance between the valve member 11 and the valve seat 13 determines (in part) the fluid flow rate along the valve member 11. The fluid flow surface area defined between the valve member and the valve seat may be determined by the sensor means 27 (not shown here) which according to the invention measure the capacitance. The fluid flow device comprises control means 29. The determination of the fluid flow surface area, using the capacitance measured, is provided to the control means 29, which control the actuator element 37. The measured (or corrected, or normalized) capacitance may be compared, for example with a preset or predetermined value, wherein measured deviations may be used by the control means 29, to control the actuator element 37 in such a way that the valve member 11 is positioned at such a distance from the valve seat such that a desired capacitance is obtained. In combination with for instance a flow sensor (not shown), a further improved fluid flow device may be obtained, with which the fluid flow rate may be controlled.

FIG. 4a-e show schematic cross-sections of the flow device 1 during different stages of the manufacture.

Figure 4A:
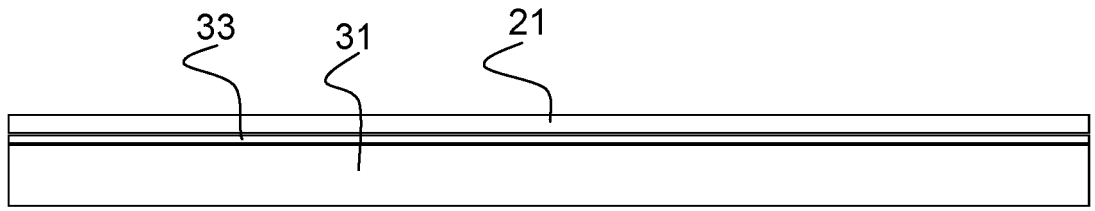

FIG. 4a shows a schematic sectional view of a raw material for manufacturing a flow device according to the invention. The raw material comprises a plate-like base part 31 which is connected to a top part 21 by means of an interconnecting insulating layer 33. The base part 31 is, in the embodiment shown, approximately 400 microns, and may for example be a silicon wafer, which is connected to a 50 micrometer thick silicon top part 21 by means of a 4 micrometer thick oxide layer 33. The raw material may thus be a silicon on insulator wafer, having a buried oxide layer as an insulating layer.

Figure 4B:
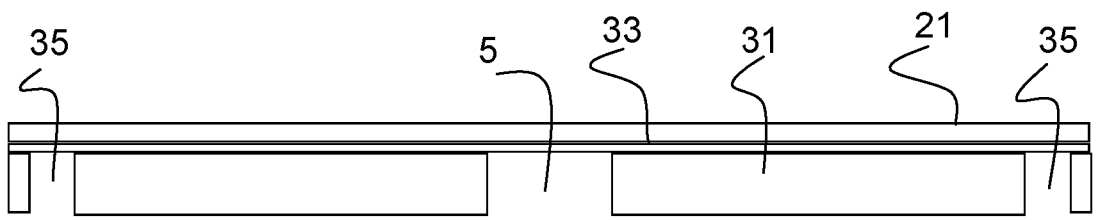

FIG. 4b shows a schematic cross-section of an intermediate step in the manufacturing of the flow device 1, following the state of FIG. 4a. Here, a flow channel 5 is formed in the base part 31 by removing material from the base part 31, for instance by using an etching process, such as deep reactive ion etching step.

Figure 4C:
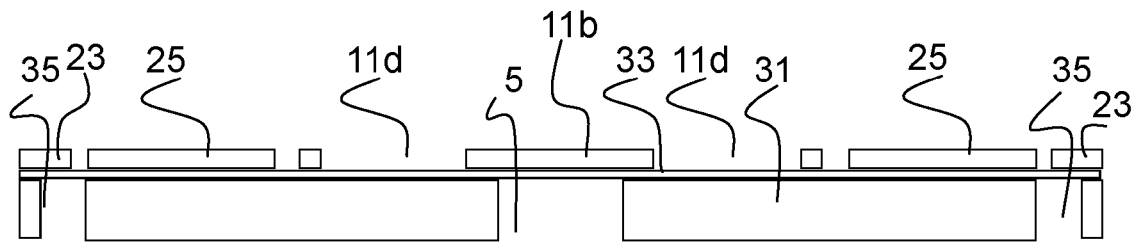

FIG. 4c shows a schematic cross-section of an intermediate step in the manufacturing of the flow device 1. Here, parts of the top part 21 are removed, for forming the valve member 11, and the flexible beam elements (not shown). Additionally, other material may be removed, such as the through-flow openings 11d are provided.

Figure 4D:
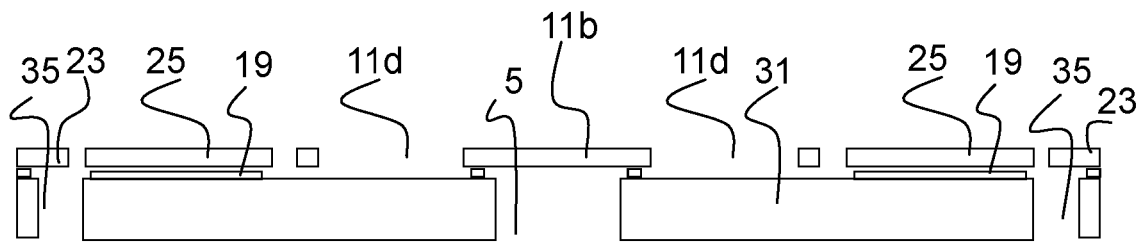

FIG. 4d shows a schematic cross-section of an intermediate step in the manufacturing of a flow device 1, wherein parts of the interconnecting insulating layer are removed. Parts of the insulating layer are removed, so that near the sides of the device 1, grooves 35 which may be used for release of single devices are fully formed. The valve member 11 is now only connected to the bottom plate 31 by means of some remnants of the insulating layer 33 between the middle valve portion 11b and the valve seat 13.

Figure 4E:
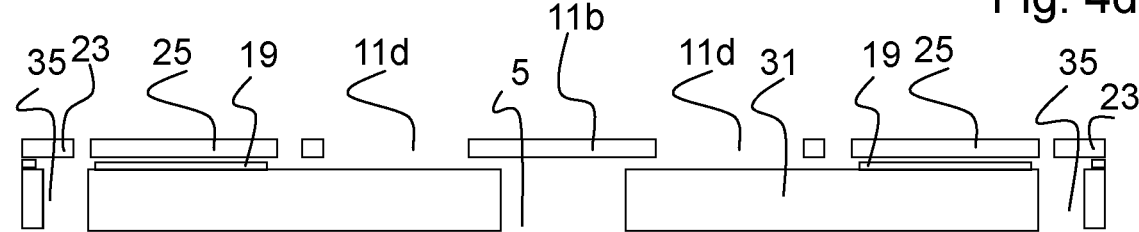

FIG. 4e shows a schematic cross-section of a flow device 1. The remains of the connection layer 33 between the middle valve portion 11b and the valve seat 13 have been removed, so that the valve member 11 is movable relative to the valve seat 13.

In the process, the valve member and the valve seat made of silicon themselves constitute capacitor plates. No additional layers need to be added on the valve member and the valve seat, for enabling them to be used as capacitor plates. A suitable electrical diagram needs to be formed or established, for allowing the device to be used as described above.

Summarized, it is clear from the above that many of the steps in the fabrication of the fluid flow device 1, which according to an embodiment of the invention is a capacitive micro-valve 1, are similar or comparable to the process reported in M. Hu et al., A silicon-on-insulator based micro check valve, J. Micromech. Microeng. 14, pp. 382-387 (2004). It may use in an embodiment two deep reactive ion etching (DRIE) steps in a silicon-on-insulator wafer (400 μm handle layer, 50 μm device layer), and one sacrificial etch of the buried oxide. The oxide layer is in an embodiment 4 μm thick, to allow for large displacements for increased flow. This also means the valve is normally open. Given a good control over the etching speeds during DRIE and HF etching, this fabrication process is very robust and near-perfect yields can be achieved. The realized microvalve chip with such a process typically is 7.5 mm in diameter and 0.5 mm thick, which is suitable for ambulant applications, such as, but can be further miniaturized if so required.

The sensor measurements may be used by control means in a feedback configuration, as well as in a feedforward configuration.

Figure 7B:
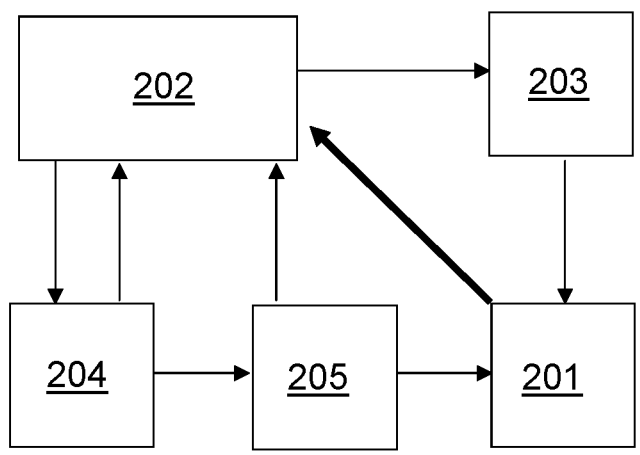

To use the sensor measurements, such as the capacitive displacement sensing, in any feedforward configuration, an accurate characterization of the flow behavior of the fluid flow device according to the invention is desired. The flow behavior has therefore been measured as a function of valve capacitance and differential gas pressure, using the measurement scheme shown in FIG. 7a, which is schematically shown in FIG. 7b.

A PI P-603.3S2 piezoelectric actuator 203 is controlled in feedback with an integrated strain gauge displacement sensor, capable of controlling the actuator 203 displacement with 8 nm resolution. A PC software program on a controller 202 controls this external actuator 203 to change the valve plate displacement in the microvalve 201. The force applied to the fluid flow device 201 in the form of a microvalve is measured with a Futek LSM250 loadcell at 10.00 V supply voltage, and is transferred to the valve plate through a stiff glass needle.

A Bronkhorst P-602CV pressure controller 204 is used to control a dry nitrogen gas flow through the microvalve 201, which is measured using a Bronkhorst F-111B gas flow meter 205 with a maximum flow range of 22.4 sccm. Capacitance is measured using an HP 4194a impedance analyzer at 100 kHz.

FIG. 5a shows the valve plate displacement 501a (right y-axis) and the gas flow 502-504 (left y-axis) as a function of the inverse of corrected capacitance $C_n$ (x-axis). Line 502 represents a gas flow at a pressure of 0.2 bar, line 503 at 0.5 bar, and line 504 at 0.9 bar. A near-linear relation (linear fit 501b) exists between displacement and inverse normalized capacitance, see line 501a, with a nonlinearity (standard linear regression error) of less than 0.03. Both gas flow and valve plate displacement show a smooth, continuous increase with decreasing capacitance, which is essential for proportional control applications. At very low $C_n^{-1}$ values (closed valve) the flow is slightly unstable because of high sensitivity to variations in valve plate displacement at that point.

Keeping the displacement constant and ramping the gas pressure up and down results in the flow profiles shown in FIG. 5b. FIG. 5b shows the flow in sccm (y-axis) as function of the pressure in millibar. Again a smooth, monotonously increasing flow profile is measured for all valve separation values 511-515. Line 511 represents a displacement of 0 micrometer, line 512 a displacement of 0.85 micrometer (at $C_n$=0.3); line 513 a displacement of 1.65 micrometer (at $C_n$=0.5); line 513 a displacement of 2.65 micrometer (at $C_n$=075); and line 514 a displacement of 3.15 micrometer (at $C_n$=0.9) At 3.15 μm (line 515) valve plate displacement ($C_n$=0.9) and 0.5 bar inlet pressure the gas flow is 9.3 sccm. The maximum flow is strongly dependent on the displacement, so using a pulling actuator to increase valve plate displacement beyond the buried oxide thickness (4 μm and more) should allow for significantly larger gas flows. The maximum leak flow when the valve is closed is measured to be less than 0.07 sccm at 0.5 bar.

The actuator element may in an embodiment be a Piezo element. Piezoelectric actuation is a strong candidate for robust, low-power control of microvalves, but suffers from mechanical hysteresis making proportional control difficult. Capacitive displacement sensing can be used for position-based feedforward flow control, minimizing the piezoelectric hysteresis and greatly improving fluidic control bandwidth.

FIG. 6 shows the measured flow (sccm, y-axis) at various gas pressures, while first closing and then opening the valve, as a function of the piezo voltage (x-axis, FIG. 6a) and of inverse normalized capacitance (x-axis, FIG. 6b). Line 601 is at 100 mbar, line 602 is at 200 mbar; line 603 is at 400 mbar; and line 604 is at 800 mbar. Here in these graphs, use is made of an integrated bimorph actuator (as shown in FIG. 3). The integrated bimporph actuator is a Noliac CMBR03 bimorph ring bender. The corrected or normalized capacitance $C_n$ is hereby defined as described above. When controlling the valve through the piezo voltage, there is a >300% difference between opening and closing flow. This hysteresis is almost eliminated when controlling the valve through the capacitance (<5% difference). The flow exhibits a smooth, continuous increase with increasing inverse capacitance, and a linear dependency on the gas pressure.

From the above it is clear that the fluid flow device according to the invention has built-in fluid flow surface area sensing, in particular capacitive displacement sensing, which has been used in flow characterization measurements to keep valve plate displacement constant with changing gas pressures. Flow characterization has shown monotonously increasing flow with increasing pressure and increasing valve separation. A near-linear relation between valve separation and inverse capacitance has been found. With these results, the potential of using the microvalve in proportional control of gas flow has been demonstrated.

It will be apparent to those skilled in the art, that the invention has been described by means of several exemplary embodiments. Further embodiments are conceivable.

For instance, it is possible that the flow path of the fluid in the device is designed in any desired manner. For instance, fluid flow may enter the device at any desired point, and exit the device at any desired point, thereby considering normal design limitations, of course. In one embodiment, flow enters the bottom part of the device, and exits a part that is positioned opposite thereof. The orientation of the device may be arbitrarily chosen, such that the bottom part is in fact an upper part, facing upwards, or any direction desired. Other designs may use a curved, for instance loop-shaped flow-path.

The valve member may be constructed in any desired fashion, without departing from the invention. Movement of the valve may be constructed in any desired fashion, wherein in a particular embodiment a translating plate design is used. Furthermore, the valve member having valve openings therein, may in an alternative embodiment be constructed as a valve membrane, without any openings. Other embodiments are also conceivable.

Finally, it is to be noted furthermore that the device according to the invention is described in an embodiment wherein the device is a so-called micro-valve. However, the design is not limited to any specific dimensions, although it has turned out that in particular for relatively small dimensions accurate measurements of the flow surface area are achievable. Accurate measurements may, however also be obtained for larger designs.

Thus it is apparent to the skilled person that alternative embodiments are thinkable. The desired protection is defined by the attached claims.

The invention claimed is:

1. A fluid flow regulator device, comprising:
A valve member and a valve seat arranged to be movable with respect to each other such that a fluid flow surface area defined by the valve member and the valve seat can be changed;
An actuator element arranged for moving the valve member relative to the valve seat;
Sensor means for measuring a capacitance related to at least a measure of the fluid flow surface area;
Reference sensor means that are arranged for measuring a reference capacitance value for a fluid flow condition; and
Control means that are connected to the sensor means and the reference sensor means, wherein the control means are arranged for controlling the actuator element based on signals obtained by the sensor means and the reference sensor means.

2. The fluid flow regulator device according to claim 1, wherein the sensor means are arranged such that the capacitance measured is inversely proportional to the distance between the valve member and the valve seat.

3. The fluid flow regulator device according to claim 1, wherein the device comprises a control unit arranged for using the reference capacitance value for correcting the capacitance measured by the sensor means.

4. The fluid flow regulator device according to claim 1, wherein the sensor means and/or reference sensor means comprise at least two capacitor plate elements, wherein the capacitor plate elements are arranged such that they define a fluid flow path in between them, through which fluid flows, in use of the fluid flow device.

5. The fluid flow regulator device according to claim 1, wherein the sensor means are arranged for directly measuring the capacitance between the valve member and the valve seat, wherein the valve member comprises a capacitor plate.

6. The fluid flow regulator device according to claim 1, wherein the sensor means comprise a plurality of sensor elements.

7. The fluid flow regulator device according to claim 6, wherein each of the plurality of sensor elements comprises a valve capacitor plate element associated with the valve member or with its position, as well as a corresponding valve seat capacitor plate element associated with the valve seat or with its position.

8. The fluid flow regulator device according to claim 6, wherein the plurality of valve capacitor plate elements are arranged concentrically.

9. The fluid flow regulator device according to claim 1, wherein the sensor means are integrated into at least one of the valve member and the valve seat.

10. A method of regulating a fluid flow using a fluid flow regulator device of claim 1, wherein the method comprises the steps of:
using the sensor means for measuring the capacitance related to at least a measure of the fluid flow surface area;
using the reference sensor means for measuring a reference capacitance value for a fluid flow condition; and
using signals obtained by the sensor means and the reference sensor means for moving the valve member relative to the seat.

11. The method according to claim 10, further comprising the step of correcting the capacitance measured by the sensor means based on the capacitance value measured by the reference sensor means.

12. A method of calibrating a fluid flow regulator device according to claim 1, comprising the steps of determining the fluid flow surface area based on signals obtained by the sensor means and the reference sensor means.

13. The method according to claim 12, wherein the method comprises the step of correcting the measured capacitance, using:

$$C_n = C_m - C_2$$

wherein $C_m$ is the measured capacitance ($C_m = C_1 + C_2$), $C_1$ is the capacitance between the valve plate and the valve seat, and $C_2$ is the substantially constant parasitic capacitance occurring in the fluid flow device.

14. The method according to claim 13, wherein the measured capacitance is corrected using the initial measured capacitance ($C_0 = C_1 + C_2$) at a predetermined valve separation:

$$C_n = \frac{C_m - C_2}{C_0 - C_2}.$$

15. The method according to claim 14, wherein $C_0$ is the initial capacitance between the valve member and the valve seat when the distance between the valve member and the valve seat is maximal.

* * * * *